(12) United States Patent
Chopra et al.

(10) Patent No.: US 10,069,909 B1
(45) Date of Patent: Sep. 4, 2018

(54) DYNAMIC PARALLEL SAVE STREAMS FOR BLOCK LEVEL BACKUPS

(71) Applicant: EMC IP Holding Company LLC, Hopkinton, MA (US)

(72) Inventors: Shelesh Chopra, Bangalore (IN); Vladimir Mandic, San Jose, CA (US); Peter Armorer, Milton (CA); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 165 days.

(21) Appl. No.: 14/974,419

(22) Filed: Dec. 18, 2015

(51) Int. Cl.
| | | |
|---|---|---|
| *H04L 29/08* | (2006.01) | |
| *H04L 29/06* | (2006.01) | |
| *G06F 11/14* | (2006.01) | |

(52) U.S. Cl.
CPC ...... *H04L 67/1095* (2013.01); *G06F 11/1464* (2013.01); *H04L 65/4069* (2013.01)

(58) Field of Classification Search
None
See application file for complete search history.

(56) References Cited

U.S. PATENT DOCUMENTS

| | | | | |
|---|---|---|---|---|
| 6,549,992 | B1* | 4/2003 | Armangau | G06F 11/1456 707/999.202 |
| 7,251,708 | B1* | 7/2007 | Justiss | G06F 11/1448 707/999.007 |
| 7,574,461 | B1* | 8/2009 | Armorer | G06F 11/1458 |
| 7,797,284 | B1* | 9/2010 | Chellappa | G06F 11/1464 707/668 |
| 8,560,788 | B1* | 10/2013 | Sreedharan | G06F 11/1461 707/640 |
| 9,165,001 | B1* | 10/2015 | Upadhyay | G06F 17/30079 |
| 2005/0138195 | A1* | 6/2005 | Bono | G06F 17/30067 709/231 |
| 2005/0165868 | A1* | 7/2005 | Prakash | G06F 3/0601 |
| 2008/0313385 | A1* | 12/2008 | Vijayakumar | G06F 3/0613 711/100 |
| 2011/0004601 | A1* | 1/2011 | Peckham | G06F 11/1453 707/752 |
| 2013/0159646 | A1* | 6/2013 | Atzmon | G06F 11/1451 711/162 |
| 2014/0317060 | A1* | 10/2014 | Shen | G06F 11/1464 707/652 |

* cited by examiner

*Primary Examiner* — Thomas J Dailey
(74) *Attorney, Agent, or Firm* — Staniford Tomita LLP

(57) ABSTRACT

Embodiments are directed to performing block-based backups of data using dynamic save streams by parsing, in a backup manager component, a data saveset to convert the data into blocks, analyzing the blocks in a stream engine component to define a number and respective size of save streams to assign certain blocks to respective streams, and transmitting the save streams to a backup storage media to perform a backup operation.

17 Claims, 5 Drawing Sheets

| RULE ID | RULE CRITERIA N | RULE CRITERIA N | SELECTED METHODOLOGY |
|---|---|---|---|
| Rule_123 | Single File | >50GB | DPSS Block Level |
| Rule_456 | Single File | <XXXX Blocks (High Density File System) | Block Level Only |
| Rule_789 | /FS | < 10 folders (Small to Medium Density File Systems) < 100 Files | DPSS Only |

DYNAMIC PARALLEL SAVE STREAMS FOR BLOCK LEVEL BACKUPS

TECHNICAL FIELD

Embodiments are generally directed to networked-based data backups, and more specifically to improving the efficiency of block-based backups by providing parallel backup save streams.

BACKGROUND

Network backup methods typically utilize file image backups and/or volume image backups. File backups backup individual files, while, a volume backup backs up all data in a specified volume. Block based backups (BBB) bypass the file system and read data directly form the disk or volume, and can either read data in the same sized blocks as the file system or in different sized blocks.

Backup systems in present enterprise deployments are under increasing pressure to meet the various service level agreement (SLA) terms that the backup vendor to do more with fewer resources, optimize the cost models, and honor ever aggressive backup SLA and SLO (service level objective) terms, such as improve TCE (total cost of entry) and reduce TCO (total cost of ownership). Recent developments have led to great improvements in the way backup is done and have cut down backup windows as well as reduced the total cost of ownership. Block based backups are one such development. In a BBB system, the backup process copies blocks of data and then all the differential backups also are taken by copying only the new blocks from last backups. This brings a lot of efficiency in the way backups are taken. Another development is that of dynamic parallel save streams (DPSS). This feature increases net aggregate backup throughput written to the backend media. It splits the data save set into multiple save streams and backs up the data in parallel. DPSS allows the streams vacated from one savepoint to be reclaimed by another. This approach allows full utilization of all available save streams at any given time regardless the number of savepoints specified for the backup or how many streams each save point has started with in the beginning.

In general, traditional backups are less efficient when there are more blocks but less of a file system/folder structure available. Backup techniques like incremental/differential and synthetic full backups (forever incremental) are not fully realized in such cases either. Thus, present backup techniques are generally limited in scope to few workflows and configurations only. Parallel save set (PSS) technology is promising with respect to increasing backup efficiency, however it is only implemented at the file level. What is required, therefore, is a backup solution that implements DPSS at the block level to obtain fully optimized block level backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
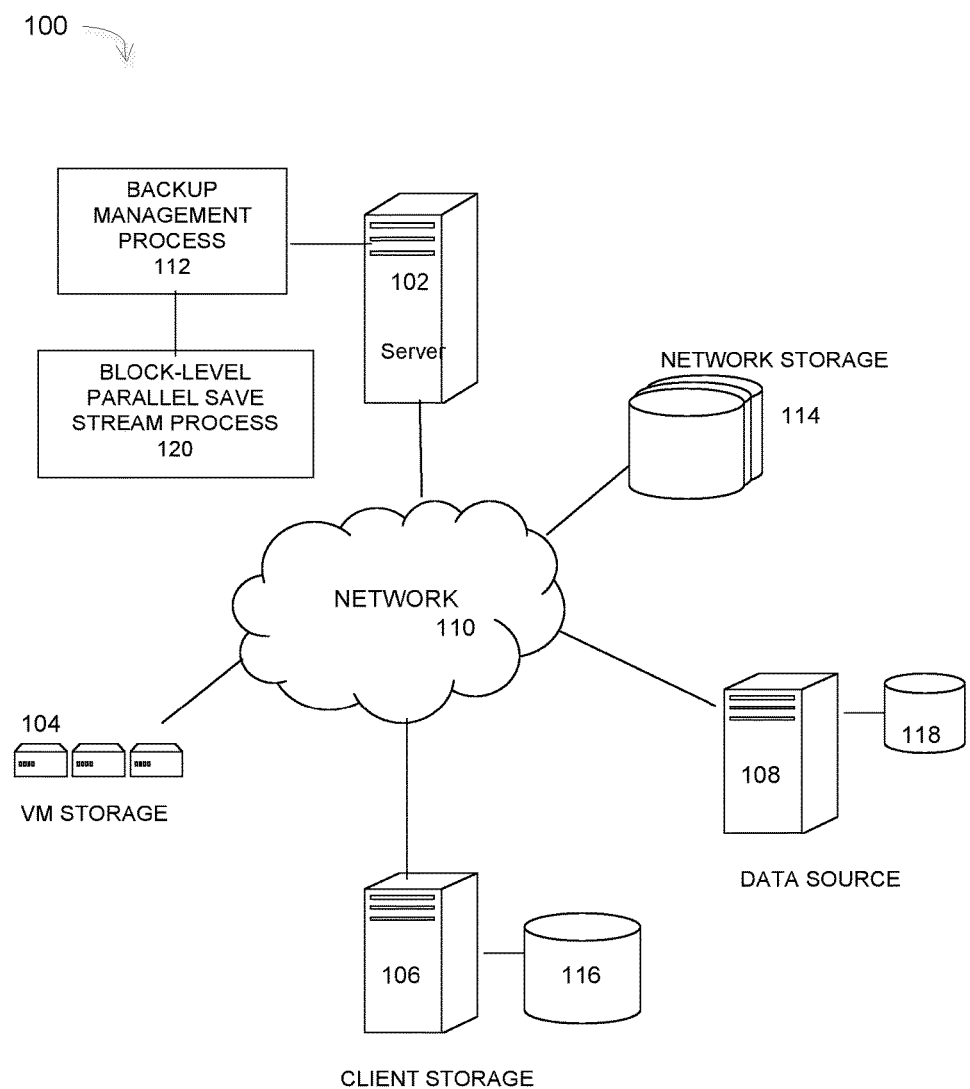
FIG. 1 is a diagram of a large-scale network implementing a sub-file changes framework for incremental backups, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a large-scale network implementing a sub-file changes framework for incremental backups, under some embodiments. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs may be provided to serve as backup targets. The target VMs do not need to be fully functional virtual machines at the time of the backup. In this case, only VM volumes are required and the VM itself (including configuration) can be constructed at the time of the recovery. The target VMs may optionally be organized into one or more vCenters (virtual centers) representing a physical or virtual network of many virtual machines, such as on the order of thousands of VMs each. The VMs or other network storage devices serve as target storage devices for data backed up from one or more data sources, such as computer 108, which may have attached local storage 118 or utilize networked accessed storage devices 114. The possible use of vCenters represents just an example of a specific platform or environment (e.g., VMware). However, it should be noted that other orchestration tools may be used instead, such as MS SCVMM for Hyper-V environments or others.

The data sourced by the data source may be any appropriate data, such as database data that is part of a database management system. In this case, the data may reside on one or more hard drives (e.g., 118) and may be stored in a variety of formats in the database or other storage mediums. One example is an Extensible Markup Language (XML) database, which is a data persistence software system that allows data to be stored in XML format. Another example is a relational database management system (RDMS) that uses tables to store the information. Alternatively, XMLs may be stored as simple files. However the presence of an enterprise-grade database is usually desired in larger application or network environments.

Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated client storage machines 106 may be provided with access to local storage media 116 or an interface to the network storage 114.

For the embodiment of FIG. 1, network system 100 includes a server 102 that executes a data backup process with a functional component 120 that implements parallel save stream backups at the block level, rather than at the file level.

Figure 2:
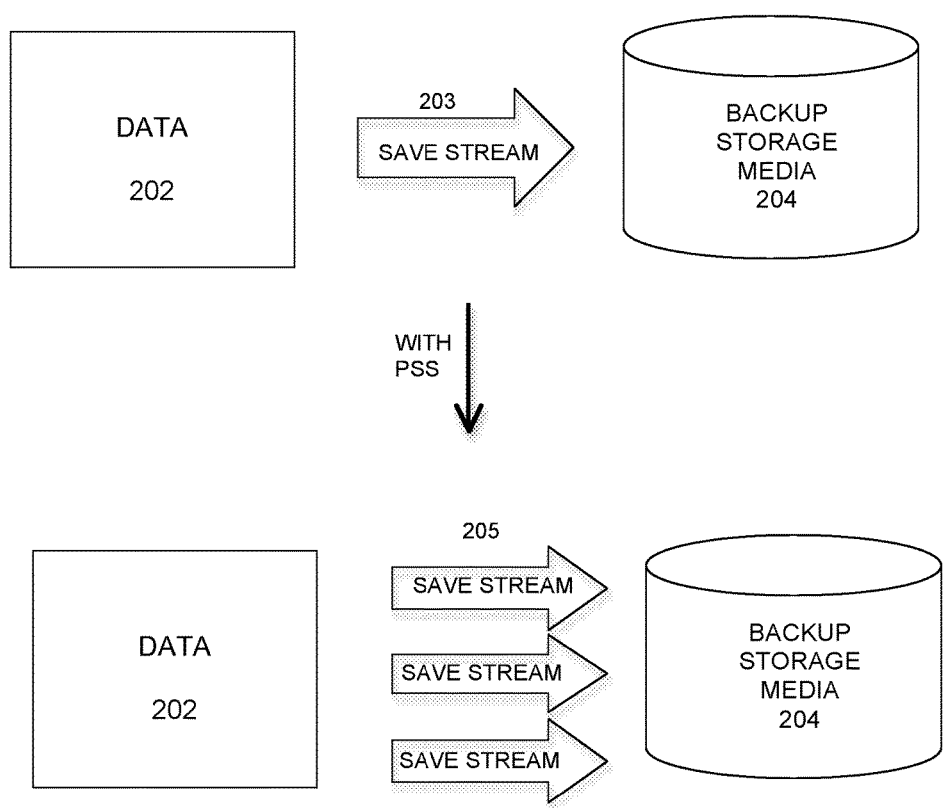
FIG. 2 illustrates a basic parallel save stream method that is adapted for use in a block-based dynamic parallel save stream system, under some embodiments.

Traditionally, a single file system or single saveset is backed up as a single save operation. In present systems that use PSS technology, parallel save streams allow for a single sufficient large or fast save point to be split into multiple concurrent savesets to speed up the backup walk process and therefore the overall backup time. In this manner instead of a scenario in which a file system is backed up to a storage media in one stream, it may be backed up in multiple streams. FIG. 2 illustrates a basic parallel save stream method that is adapted for use in a block-based DPSS system, under some embodiments. As shown in FIG. 2, in a traditional single stream process, a set of data 202 to be backed up is saved to backup storage media 204 in a single save stream 203. With PSS enabled, the single saveset 203 is split automatically into a number of parallel (e.g., simultaneous or concurrent) save streams 205 for backup onto media 204. The number and size of each save stream may be configured by the system depending on backup system constraints and configurations and the size of the save set 202.

In a prior art system, the saveset 202 may be a file system save set (/bigfilesys). This approach, however, assumes that the file system can be broken down into multiple files and each stream would then represent all of the different blocks of a separate subset of files, i.e., all blocks for a file are within one stream. Embodiments of the block-level PSS process 120 implements dynamic save streams at the block level. Dynamic PSS at block levels can improve the overall performance of the backup system and shrink the backup windows across DPSS and BBB systems that are already implemented. Under this system, the DPSS process 120 makes the save streams split at the block level so even if there is just a single large file, it can even split the same data at the block level. In this manner, logically contiguous blocks of a large file would be divided intact among the streams, and there would be no fine granularity multiplexing. For example for a 32 GB file, the first set of 8 GB blocks would go to parallel stream 1, next set 8 GB would go to parallel stream 2, and so on. The PSS system would include a multiplexing intra-file backup reader, and similarly a de-multiplexing intra-file recover writer.

Figure 3:
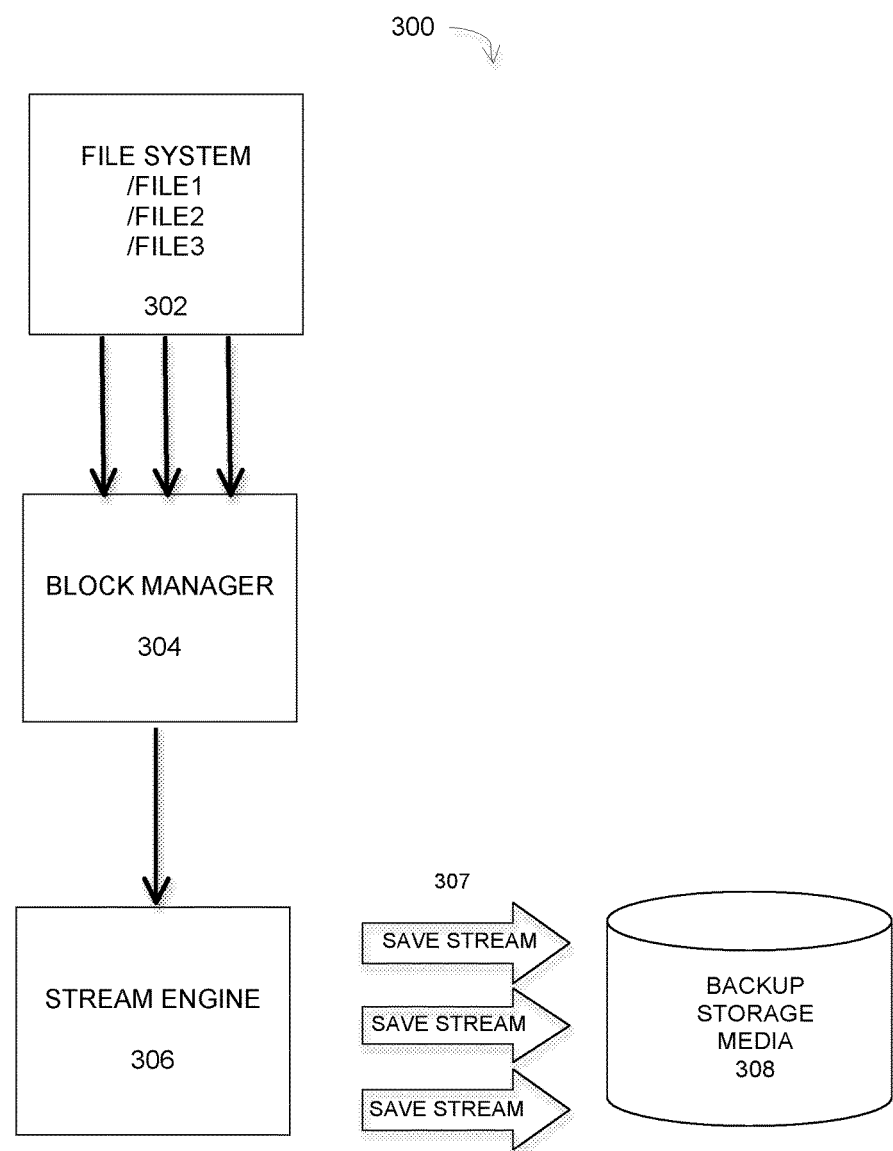
FIG. 3 illustrates a block-based dynamic parallel save stream system, under some embodiments.

FIG. 3 illustrates a block-based DPSS system, under some embodiments. The modules of system 300 parse the backup objects to determine the save points for backups. For example, there can be one or multiple files constituting the save point for backups. As shown in FIG. 3, a file system 302 includes three files (/FILE1, /FILE2, and /FILE3) though any number of files may be provided. A first parse of the objects converts the objects into blocks using methods that may be implemented by the backup manager 112. The block manager 304 generates the list of blocks that need to be backed up and passed all the blocks that need to be copied to a stream engine 306. The role of stream engine is to understand how many blocks need to be backed up and also to optimize the organization of the blocks. That is, it determines which blocks should be part of a particular stream. For example, in certain optimizations, all continuous blocks should be part of one single stream. The stream engine 306 decides how many streams should be run in parallel based on the configuration of a parallelism policy that is set in the backup software and defined or made available to backup manager 112. Thus, the stream engine 306 generates the parallel save streams 307 that are sent to the backup storage media 308. Any practical number 1 to N save streams may be generated and sent in parallel by stream engine 306.

Figures 4, 5:
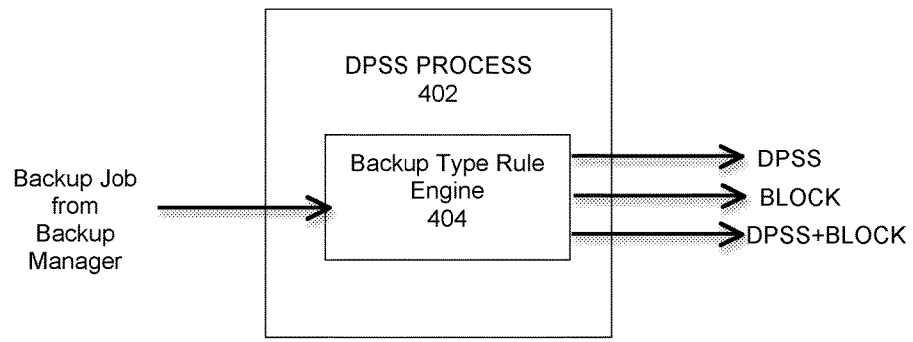
FIG. 4 illustrates a DPSS processing component that includes a backup type rule engine, under some embodiments.
FIG. 5 is a table that lists certain example criteria used by the rule engine of FIG. 4, under an embodiment.

In certain circumstance, it may be more optimum to not always convert the backup to be streamed at the block level. In this case, the DPSS process 120 includes certain intelligence or sub-processes that decide if the backup should be at the block level only, DPSS level only, or DPSS and block-level together. FIG. 4 illustrates a DPSS processing component 402 that includes a backup type rule engine 404, under some embodiments. The rule engine 404 receives a backup job from the backup manager 112, and performs the backup operation using DPSS only, block only, or DPSS plus block level parallel streams. The rule engine 404 uses certain criteria to trigger the different types of backup methodologies. FIG. 5 is a table that lists a rule engine schema and certain example criteria used by the rule engine of FIG. 4, under an embodiment. As shown in FIG. 5, rules are referred to under unique identifiers (ID) and each rule has certain defined criteria. The criteria may include characteristics such as file organization, file type, file size, file density, and other similar characteristics. The combination of criteria determines the backup methodology used, such as DPSS only, block only, or DPSS+block, as shown in FIG. 4. The rule engine can be configured to select the backup methodology based on any practical combination of criteria or threshold values, and weighting of criteria. For example, the methodology selection algorithm may be expressed as:

$$\text{Methodology} = w_1 RC1 + w_2 RC2 + \ldots w_N RCN$$

Where the selected methodology is a combination of a number, N, rule criteria (RC) each weighted by a respective weighting value $w_x$, based on the relative importance of each respective criteria.

For the example of FIG. 5, single files of greater than a certain threshold value (e.g., 50 GB) are backed up using DPSS block-level streams, while those of fewer than a certain number of blocks are backed up using block level methods only. Similarly file systems with fewer than a certain number of folders (e.g., 10 folders) or files (e.g., 100 files) are backed up using DPSS only. It should be noted that FIG. 5 is intended to be for example only, and many other characteristics, criteria, threshold values and resulting methodologies are also possible.

In general, the block-based DPSS process increases net aggregate backup throughput written to the backend media. It splits the data save set into multiple save streams and backs up the data in parallel. DPSS allows the streams vacated from one savepoint to be reclaimed by another. This mechanism allows for full utilization of all available save streams at any given time regardless the number of savepoints specified for the backup or how many streams each save point has started with in the beginning, and is thus a dynamic process. The term "dynamic" may refer to the determination of block sizes and number/size of save streams at runtime during backup operations by one or more processing components that assess system configuration (e.g., processor load, storage type/capacity, network bandwidth, etc.), backup job requirements (file sizes, block sizes, directory organization, backup method, etc.) and determine the optimum save stream configurations based on these parameters as applied to certain rules.

The block-based DPSS process is generally used for very large file backups, such as a database physical file or raw device, and is usually a snapshot or consistent state image of the data to be backed up. This use case is internal to a save point, i.e., one file somewhere under a savepoint directory. The process splits the large file (or raw device) into N parallel streams. The number of streams can be a set default number (e.g., N=4), or it can be set by user configuration. The split can be made into N logically contiguous sequential sections, i.e., $1^{st}$ quarter of file to stream#1, $2^{nd}$ to stream#2, $3^{rd}$ to stream#3, and $4^{th}$ to stream#4, etc. Alternatively, it can be split into interleaved logically sized blocks, e.g., $1^{st}$ 4-MB block to stream#1, 2nd to stream#2, $3^{rd}$ to stream#3, $4^{th}$ to stream#4, restart $5^{th}$ to stream#1, etc. For a raw device, the split would inherent be physically contiguous sections or blocks. The quarter split approach described above can be considered an extreme form of interleaved splitting using the largest possible block size. However, it could present recovery problems if the receiving file system would like to see the file be recovered in a more natural growth pattern, which true interleaved recovery could better provide.

Figure 6:
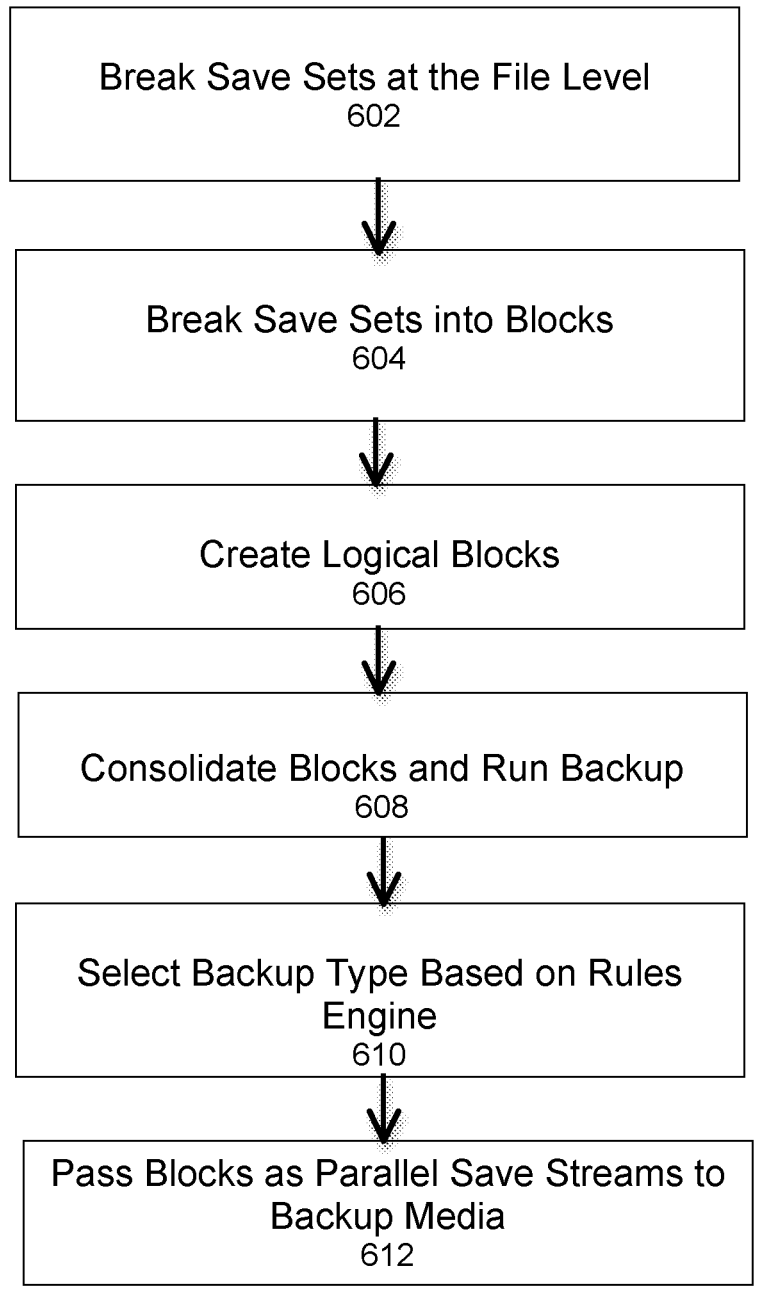
FIG. 6 is a flowchart that illustrates a method of performing block-based DPSS, under some embodiments.

FIG. 6 is a flowchart that illustrates a method of performing block-based DPSS, under some embodiments. As shown in FIG. 6, the process begins by breaking the save sets at the file level, 602. It then breaks the save sets into blocks of fixed or variable length, 604. This allows the system to have the data broken down so that it can generate the different offsets for random processing. For example, for 1 TB file with four parallel streams, the process creates four worker processes or threads where each opens a file separately and moves the starting offset to (filesize*thread_number/thread_count). As an example, the first thread may have the number 0, so the first thread would read from offset 0, the second would read from 250 GB mark onwards (for example), the third would read from 500 GB mark onwards and the fourth from 750 GB mark onwards, and so on. This process specifies that each thread has no lock so that each thread gets a different file handle for the same file)

The process then creates logical blocks for the saveset, 606. The logical organization comprises the blocks starting from different offsets. Next, it consolidates the blocks and runs the backup operation, 608. The rules engine 404 of the DPSS process 402 determines the type of backup to be performed based on certain defined criteria (e.g., FIG. 5) and combination logic, block 610. For block-based or DPSS plus block-based backups, the blocks are passed as a number of parallel streams together through a data transmission pipe to the backup media, 612. The number of streams may correspond to or be limited by the parallelism parameter defined in the backup manager. In an embodiment, the parallelism parameter is set in the backup manager (e.g., NetWorker) and can represent an optimal number of target sessions (i.e., the optimal number of savesets running to a backup device). It may also refer to client parallelism (i.e., the number of savesets a client can simultaneously send in a backup), or server parallelism (i.e., the number of savesets a backup server will simultaneously allow to be active for the backup.

Using the rule engine, the process converts the blocks dynamically based on certain characteristics of the backup job. For example, the saveset is broken into blocks only if the size (save point) of the data is greater than a certain number of GB or for incremental backups, if the size of data is greater than a minimum amount of changed data (e.g., >5%). Many other similar rules can be defined based on system constraints and requirements.

In an embodiment, the block-based DPSS process works equivalently for full and incremental backups. It can also be extended to other workflows like clone or staging workflows. The block-based DPSS logic can also be leveraged in various gateways like Cloud gateways and CloudBOOST provided by EMC Corporation. It can be also be integrated between the various other interfaces example VSS writers, Oracle SBT Blocks, and so on.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data.

For some embodiments, the backup operation that backs up the parent volume to the file may be performed using a block based backup (BBB) operation that uses a dynamic parallel save stream process. In a block based backup, the information may be read from the parent volume block by block regardless of the number of files stored in the parent volume. The backup operation may take an image of the parent volume without having to refer to the file system associated with the parent volume.

The processes of system 100 can be used in scenarios where there is a need to backup a database (e.g., Microsoft Exchange database), or where there is an application in which it would be desirable to backup multiple files (e.g., two or more files) present in a particular folder on the source volume, and such files can be very large. The system can be used to backup data at the block-level, e.g., a block-based sub-file backup using DPSS. A technique of the system provides for backing up the used blocks of a file by identifying the file extents occupied by the file. In general, a file extent is a contiguous area of storage reserved for a file in a file system, represented as a range, and any file can have zero or more extents. The file extents provide the starting offset and the length of the particular extent occupied by the file. In other specific embodiments, the system further provides for incremental backups and artificially synthesizing full backups at the file or sub-file level.

The backup storage server 102 includes a catalog and local backup media and/or interfaces to other VM-based backup target to store data backed up from the data source 108 or other clients. The backed up data may include a volume, portion of a volume, applications, services, user-generated or user data, logs, files, directories, databases, operating system information, configuration files, machine data, system data, and so forth. The catalog provides an index of the data stored on the backup storage server or protection storage managed by the backup storage server. The backed up data may be stored a logical entity referred to as a saveset. The catalog may include metadata associated with the backup (e.g., saveset) such as an identification of the file or files stored on the backup storage server (e.g., globally unique identifier (GUID) of a backed up database), the time and date of backup, size of the backup, path information, and so forth.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for performing data backups in a data backup system having a backup manager computer and storage medium, comprising:
   parsing, in the backup manager computer, a data saveset to convert the data into blocks to create block level backups using dynamic parallel save stream technology;
   analyzing the blocks in a stream engine component of the backup manager computer to define a number and respective size of parallel save streams to assign certain blocks to respective streams in accordance with a parallelism policy;
   determining, in a rule engine of the backup computer, whether to include at least some file level backups as part of the block level backups for the data saveset;
   transmitting the save streams to a backup storage media, wherein the number of save streams is one of a default value or a user configurable value and is denoted N, and further wherein the stream engine component creates N worker threads, where each thread opens a file separately and moves the starting offset to a respective defined value, wherein each thread has no lock so that each thread gets a different file handle for the same file, and yet further wherein the respective defined value for a thread equals the file size multiplied by the result of the thread number divided by the thread count for the respective thread; and
   storing the save streams in the storage medium to complete a backup operation.

2. The method of claim 1 wherein the blocks are one of a fixed length or a variable length.

3. The method of claim 2 further comprising:
   creating logical blocks for the saveset, wherein a logical organization comprises the blocks starting from different offsets;
   consolidating the blocks;
   generating the number of save streams from the consolidated blocks; and
   running the backup operation to save the saveset to the backup media storage.

4. The method of claim 3 wherein the backup operation comprises one of a full backup or an incremental backup, and the saveset represents a snapshot or consistent state image of a large database.

5. The method of claim 3 further comprising determining, in a rules engine, a type of backup to be performed based on certain defined rule criteria, the type of backup comprising one of a file level parallel save stream backup, a block level parallel save stream backup, and a combined file and block level parallel save stream backup.

6. The method of claim 5 wherein the defined rule criteria include a plurality of saveset characteristics comprised of at least: file size, file density, block size, and percentage change of data for incremental backups.

7. The method of claim 6 further comprising assigning respective weights to each characteristic of the plurality of saveset characteristics, and combining the rule criteria according to a defined formula to determine the backup type based on the plurality of weighted save set characteristics.

8. The method of claim 3 wherein contiguous blocks are assigned to a same respective save stream.

9. The method of claim 3 wherein the saveset is dynamically split into the save streams by one of: splitting into N logically contiguous sequential sections; or splitting into interleaved logically sized blocks.

10. A system configured to perform data backups across a network in a data backup system having a backup manager computer and storage medium, comprising:
    a backup manager component parsing, in the backup manager computer, a data saveset to convert the data into blocks to create block level backups using dynamic parallel save stream technology, wherein the number of save streams is one of a default value or a user configurable value, and further wherein the number of save streams is denoted N, and yet further wherein the stream engine component creates N worker threads, where each thread opens a file separately and moves the starting offset to a respective defined value, wherein each thread has no lock so that each thread gets a different file handle for the same file, and further wherein the respective defined value for a thread equals the file size multiplied by the result of the thread number divided by the thread count for the respective thread;
    a save stream engine coupled to the backup manager component and analyzing the blocks in a stream engine component to define a number and respective size of parallel save streams to assign certain blocks to respective streams in accordance with a parallelism policy;
    an interface transmitting the save streams to a backup storage media; and
    the backup storage media storing the transmitted save streams.

11. The system of claim 10 wherein the blocks are one of a fixed length or a variable length.

12. The system of claim 11 wherein the save stream engine further:
    creates logical blocks for the saveset, wherein a logical organization comprises the blocks starting from different offsets;
    consolidates the blocks and generates the number of save streams from the consolidated blocks; and
    transmits the save streams in a backup operation to save the saveset to the backup media storage.

13. The system of claim 12 further comprising a rules engine determining a type of backup to be performed based on certain defined rule criteria, the type of backup comprising one of a file level parallel save stream backup, a block level parallel save stream backup, and a combined file and block level parallel save stream backup.

14. The system of claim 13 wherein the defined rule criteria include a plurality of saveset characteristics comprised of at least: file size, file density, block size, and percentage change of data for incremental backups.

15. The system of claim 14 further wherein the rules engine assigns respective weights to each characteristic of the plurality of saveset characteristics, and combines the rule criteria according to a defined formula to determine the backup type based on the plurality of weighted saveset characteristics.

16. The system of claim 15 wherein the backup operation comprises one of a full backup or an incremental backup, and the saveset represents a snapshot or consistent state image of a large database, and wherein the number of save streams is determined by a parallelism parameter defined in the backup manager.

17. A computer program product, comprising a non-transitory computer-readable medium having a computer-readable program code embodied therein, the computer-readable program code adapted to be executed by one or more processors to perform data backups in a data backup system having a backup manager computer and storage medium by executing instructions implementing a method comprising:

parsing, in the backup manager computer, a data saveset to convert the data into blocks to create block level backups using dynamic parallel save stream technology;

analyzing the blocks in a stream engine component of the backup manager computer to define a number and respective size of parallel save streams to assign certain blocks to respective streams in accordance with a parallelism policy;

determining, in a rule engine of the backup computer, whether to include at least some file level backups as part of the block level backups for the data saveset;

transmitting the save streams to a backup storage media, wherein the number of save streams is one of a default value or a user configurable value and is denoted N, and further wherein the stream engine component creates N worker threads, where each thread opens a file separately and moves the starting offset to a respective defined value, wherein each thread has no lock so that each thread gets a different file handle for the same file, and yet further wherein the respective defined value for a thread equals the file size multiplied by the result of the thread number divided by the thread count for the respective thread; and storing the save streams in the storage medium to complete a backup operation.

* * * * *